P. R. CURTIS.
LIGHTING ATTACHMENT FOR AUTOMOBILES.
APPLICATION FILED FEB. 4, 1916.

1,201,942.

Patented Oct. 17, 1916.

Inventor:
Paul R. Curtis,
by Walter E. Lombard,
Atty.

UNITED STATES PATENT OFFICE.

PAUL R. CURTIS, OF BRAINTREE, MASSACHUSETTS.

LIGHTING ATTACHMENT FOR AUTOMOBILES.

1,201,942.  Specification of Letters Patent.  Patented Oct. 17, 1916.

Application filed February 4, 1916. Serial No. 76,484.

*To all whom it may concern:*

Be it known that I, PAUL R. CURTIS, a citizen of the United States of America, and a resident of Braintree, in the county of Norfolk and State of Massachusetts, have invented certain new and useful Improvements in Lighting Attachments for Automobiles, of which the following is a specification.

This invention relates to lighting attachments for motor vehicles, and has for its object the production of means whereby a reflecting surface at the front of the car is highly illuminated between the adjacent head lights on opposite sides of said reflecting surface.

The invention consists in providing the front of the car with a light, between the usual head lights, the rays from which are projected upon a reflecting surface at the front of a car and brilliantly illuminate said surface, thereby minimizing the effect of the glare of the head lights upon the eyes of the driver of a car approaching in the opposite direction.

The invention further consists in certain novel features of construction and arrangement of parts which will be fully understood by reference to the description of the parts and to the claims hereinafter given.

Figure 1:
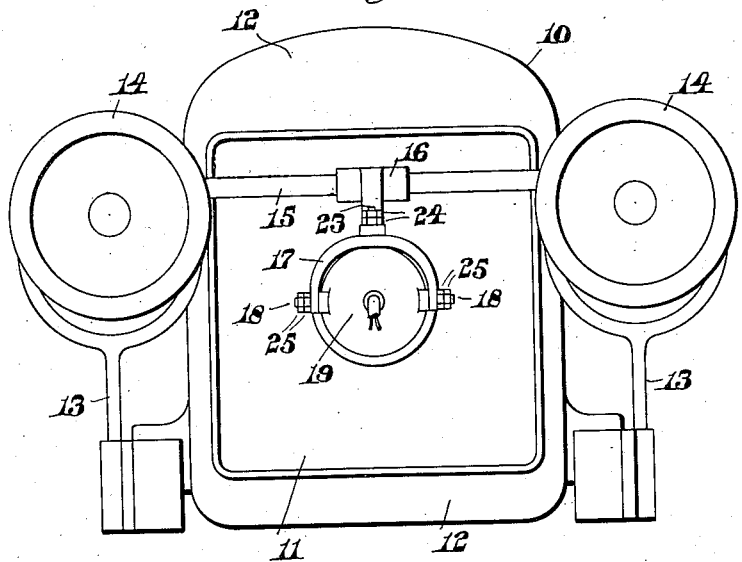
Figure 2:
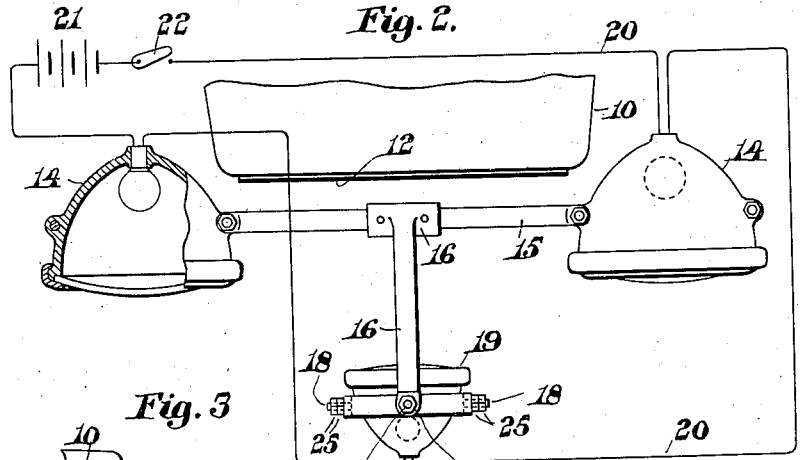
Figure 3:
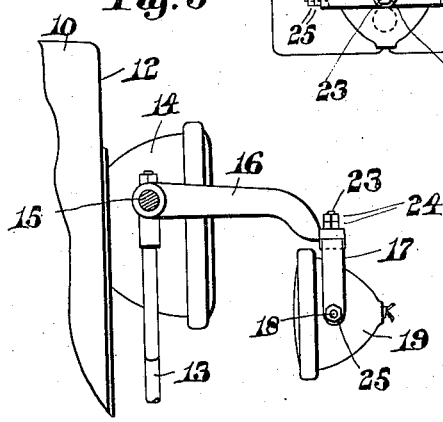

Of the drawings: Figure 1 represents an elevation of a portion of the front of a motor vehicle and showing applied thereto the devices embodying the principles of the present invention. Fig. 2 represents a plan of the same, and Fig. 3 represents a side elevation of the same.

Similar characters designate like parts throughout the figures of the drawings.

In the drawings, 10 is the front of the engine casing of a motor vehicle, said front being provided with the usual radiator 11. This radiator and the front surface 12 of the casing 10 is preferably treated so that the entire front surface of the casing and the radiator are adapted to reflect any rays of light projected thereon. Secured to opposite sides of the casing 10 are brackets 13 which have mounted therein headlights 14.
The head lights 14 are connected by means of a stay rod 15 having secured thereto intermediate of the head lights 14 a bracket 16. This bracket 16 extends forward from the stay rod 15 and has swiveled to its outer end a bifurcated support 17 depending therefrom. Pivoted at 18 to the support 17 is a lamp 19 adapted to project rays of light against the reflecting surfaces 11 and 12 on the front of the car. The lamp 19 and the head lights 14 are all connected in the same electric circuit 20 having a battery 21 and switch 22 therein. When the switch 22 is closed the lamp 19 and headlights 14 may be simultaneously lighted while the breaking of the circuit by means of the switch 22 will extinguish said lamp and head lights.

When the rays of light are projected onto the reflecting surface 11—12, the front of the car will be illuminated to such an extent that the effect of the glare from the head lights 14 on the eyes of the driver of a motor car approaching in an opposite direction will be minimized. This is due to the fact that by projecting the rays of light upon the front of the car all of the space between the head lights will be illuminated so brightly that the light from the head lights will not be so glaring as would be the case where each head light was surrounded by perfectly black background. At the same time the head lights 14 will not be dimmed in any manner, and full benefit of the rays of light therefrom will be derived.

Owing to the location of the lamp 19 so far in advance of the front of the car, the rays of light therefrom will be projected not only upon the reflecting surfaces 11 and 12 but also upon the fenders of the car, thereby showing the full width of the car to the driver of a vehicle approaching in an opposite direction. This is of considerable advantage, as ordinarily when two cars are passing each other at night, each driver has considerable difficulty in determining the full width of the other car.

In case of accident, the lamp 19 may be swung about its pivots 18 to project the rays of light therefrom onto the ground or onto the running gear at either side of the car by moving the support 17 about the swivel connection 23. This swivel connection 23 is provided with suitable nuts 24 by which the support 17 may be locked in adjusted position. In like manner, the pivots 18 are provided with suitable nuts 25 by which the lamp 19 may be locked in adjusted position.

In the event of the lamp in either of the head lights 14 becoming inoperative, the lamp 19 may be swung about its pivots 18 so that its rays may be projected forward, thus providing the two lights required by law.

When it is not desired to project rays of light from the lamp 19 upon the reflecting surface 11—12, this lamp 19 may be adjusted so that the rays of light therefrom may be projected in the gutter alongside the road, which would be a great advantage in traveling over country roads with which the driver is unfamiliar.

It is believed that the operation and many advantages of this invention will be fully understood from the foregoing description.

Having thus described my invention, I claim:

1. In a device of the class described, the combination with a reflecting surface at the front of a motor vehicle; a head light at each side thereof; and a third light intermediate said head lights and adapted to project rays of light over said reflecting surface.

2. In a device of the class described, the combination with a reflecting surface at the front of a motor vehicle; a head light at each side thereof; and means for projecting rays of light upon said reflecting surface.

3. In a device of the class described, the combination with a reflecting surface at the front of a motor vehicle; a head light at each side thereof; a stay rod interposed between said head lights; and means mounted upon said stay rod for projecting rays of light upon said reflecting surface.

4. In a device of the class described, the combination with a reflecting surface at the front of a motor vehicle; a head light at each side thereof; a stay rod interposed between said head lights; a bracket secured to said stay rod; and means pivotally mounted in said bracket for projecting rays of light upon said reflecting surface.

5. In a device of the class described, the combination with a reflecting surface at the front of a motor vehicle; a head light at each side thereof; a stay rod interposed between said head lights; a bracket secured to said stay rod; and means mounted in said bracket for projecting rays of light upon said reflecting surface.

6. In a device of the class described, the combination with a reflecting surface at the front of a motor vehicle; a head light at each side thereof; a stay rod interposed between said head lights; a bracket secured to said stay rod; a bifurcated support swiveled to said bracket; and means pivotally mounted in said support and adapted to project rays of light upon said reflecting surface.

Signed by me at 4 Post Office Sq., Boston, Mass., this 29th day of January, 1916.

PAUL R. CURTIS.

Witnesses:
 WALTER E. LOMBARD,
 NATHAN C. LOMBARD.